Aug. 6, 1929.                F. ULRICH                1,723,496
                        SEPARABLE FASTENER
                        Filed June 2, 1925
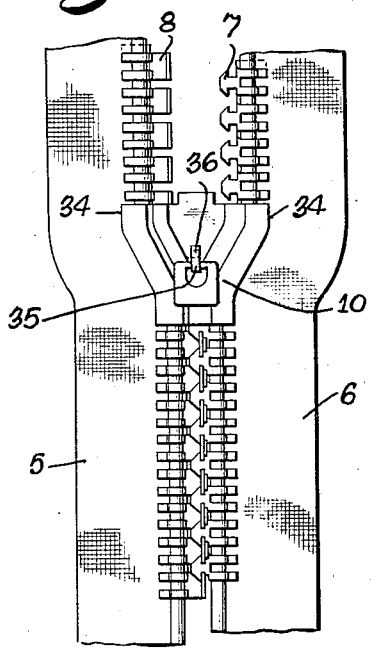
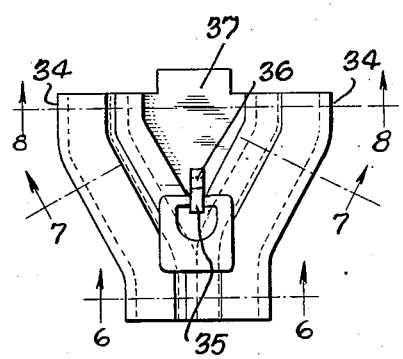
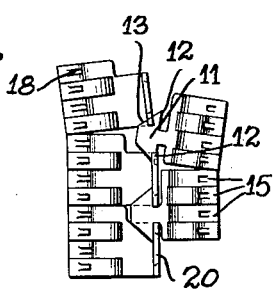
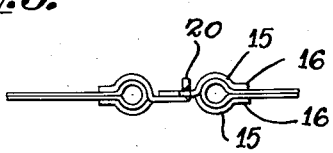
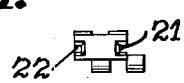
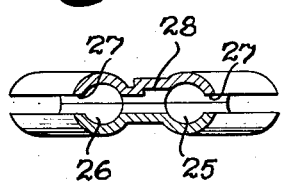
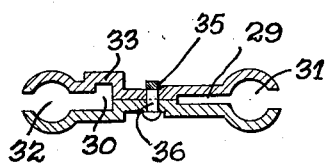
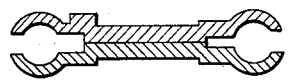
INVENTOR.
Fredrick Ulrich
BY
Emery Booth Janney & James
ATTORNEYS.

Patented Aug. 6, 1929.

1,723,496

UNITED STATES PATENT OFFICE.

FREDRICK ULRICH, OF NEW YORK, N. Y.

SEPARABLE FASTENER.

Application filed June 2, 1925. Serial No. 34,296.

The present invention relates to separable fasteners, and more particularly to separable fasteners of the type in which two flexible stringers carry series of cooperating fasteners arranged to be engaged and disengaged by a sliding cam device mounted on both members and movable longitudinally along the length of these members to engage and disengage the fasteners.
The object of the invention is to provide an improved fastener which can be cheaply and expeditiously manufactured and readily applied to the parts to be connected.

The nature and objects of the invention will be better understood from a consideration of a particular illustrative embodiment thereof for the purpose of which description reference should be had to the accompanying drawing forming a part hereof, and in which:
Figure 1 is a view in front elevation of a pair of stringers with fasteners constructed in accordance with the invention applied thereto;

Figure 2 is a detail view showing the metallic fastener elements drawn to a larger scale;

Figure 3 is an end view showing the two cooperating fasteners;

Figure 4 is a detailed view in end elevation of the female fastener showing the beveled form of the slots;

Figure 5 is an enlarged detail view in front elevation of the sliding cam device which operates to connect and disconnect the fasteners;
Figure 6 is a sectional view taken on the line 6—6 of Figure 5;

Figure 7 is a sectional view taken on the line 7—7 of Figure 5; and

Figure 8 is a sectional view taken on the line 8—8 of Figure 5.

In the structure shown, flexible stringers 5 and 6 adapted to be attached to the edges of the parts to be separably connected, carry series of interengaging fasteners 7, 8. A sliding cam member 10 engaging the fasteners operates upon movement in one direction to connect the fasteners and upon movement in the opposite direction to disconnect them.

The fasteners are of such design that they may be formed economically and expeditiously from sheet metal by stamping them out and binding them with suitable dies and the interengaging surfaces lie at right angles to the direction of the strain thereon so that there is little or no tendency for the fasteners either to be separated or to be drawn into wedging relation with each other or with the sliding cam under the strain of use. Each male member is formed with a head 11 having two laterally projecting lugs 12, 12, which are beveled on their outer faces as at 13 to provide clearance to facilitate engagement and disengagement with the cooperating female fasteners. The shank portion is slitted in three places to provide four tongues 15, two of which are bent to one side from the central plane of the fastener and the other two of which are bent to the opposite side as best indicated in Fig. 3. These tongues are formed to embrace the corded edge of the stringer and the extreme end portions thereof are extended parallel to the central plane of a fastener to lie closely adjacent and against the body of the stringer as indicated at 16, 16 in Fig. 3 when the fastener is applied. In order to improve the grip of the tongues 15, they are slitted as indicated at 18 to provide inwardly extending tongues with relatively square edges which engage against the rear side of the corded edge. The arrangement of the tongues shown gives a neat and regular appearance to the finished device and provides a sufficiently continuous metallic bearing surface for the sliding cam 10.

The female fasteners are formed at their outer ends to suitably engage the heads of the male fasteners and their shanks are formed with tongues 18 to engage the stringers 5 which tongues are in all respects similar to the tongues of the male fasteners. The head of each female fastener is bent at a right angle to the body thereof as indicated at 20 in Fig. 3 which head is slotted on each side as indicated at 21 in Fig. 4 to receive the portion of the shank of the male fastener adjacent the head 11 thereof. The female fastener may be slightly beveled as indicated at 22 at each edge to facilitate the engaging movement of the fasteners. This bevel may be formed by means of the dies used in making the fastener and should not require a separate operation in the manufacture.

The sliding cam 10 may be formed from sheet metal shaped in dies to provide cam slots arranged in the form of a Y to cause a turning of the male and female fasteners alternately into interengaging position as the cam is moved in one direction therealong and similarly to provide a turning disengaging movement of the fasteners as the cam is moved in the opposite direction. The shape of the cam in cross-section is best shown in Figs. 6 and 7. At its lower end, the cam is formed with one channel having engaged portions 25, 26 arranged to fit over the bulged shanks of the fasteners where they embrace the corded edge of the stringer. The extreme edges 27 of the material of the cam engage and ride upon the ends 16 of the tongues 15. The intermediate portion of the channel is provided with an enlargement 28 arranged to receive the heads 20 of the female fasteners. At the upper portion the cam is formed with two channels 29, 30 adapted to receive and guide respectively the male and female fasteners. The enlarged portions 25, 26 of the lower channel portions are extended upwardly and form part of these upper channels as indicated at 31, 32. The channel 30 is provided with an enlarged portion 33 which forms in fact a continuation of the enlarged portion 28 of the lower channel to receive the heads 20 of the female fasteners 8.

Fasteners of the type described are sometimes used under conditions such that it is desirable to leave the strips connected for a portion of their length only and yet it is desirable that the cam should be so arranged that a pull on the free edges of the material will not cause the cam to be moved along the fasteners to further separate the connected edges. For this purpose, I prefer to form the cam with the upwardly extending portions of the fastener engaging cam slots extending parallel to each other as indicated at 34 in Fig. 5. By so forming the cam member, a lateral pull upon the connected strips will be resisted by the parallel portions of these cam slots so that the force applied will not tend to move the cam along the row of fasteners. The fasteners will thus remain connected even though the cam member has not been moved to the end of the row of fasteners.

In order to facilitate the movement of the cam, I prefer to provide a suitable handle member such as the tab 35 shown in Fig. 5 and which is secured to the cam member by a suitable rivet. As shown, the rivet 36 has a square shank, thus preventing rotation and its head is formed to provide a loop to receive a ring portion of the tab. The rivet also performs the function of securing the two parts of the cam together. It will be understood that these two parts of the cam are integrally connected at their top portions as indicated at 37 in Fig. 5, the whole cam being formed of one piece of sheet metal bent to the shape shown. As the cam slide moves upwardly, the fasteners engaged thereby are alternately swung from the diagonal position to the horizontal position, see Figs. 1 and 2, to interengage with the next fastener below.

The fastener shown can be expeditiously and economically manufactured and will not bind either in use or during the engaging and disengaging operation of the cam. Any suitable arrangement may be provided for limiting the upward movement of the cam as it reaches the end of the series of fasteners in its operative movement.

The description of the particular embodiment is illustrative merely and is not intended as defining the limits of the invention.

I claim:

1. A separable fastening device comprising a pair of flexible stringers each having a corded edge, series of cooperating male and female fasteners secured to the respective stringers, and a sliding cam device movable therealong to connect and disconnect the fasteners, the fasteners of each series being formed of sheet metal stamped to form alternate tongues shaped to partially encircle the corded edges of the stringer and having extensions lying parallel to the length of the fastener to provide a shoulder for engagement with the sliding cam device.

2. A separable fastener comprising a pair of flexible stringers, series of cooperating male and female fasteners secured to the respective stringers, and a sliding cam device movable therealong to connect and disconnect the fasteners, the female fasteners being formed of sheet metal with a head portion bent at substantially a right angle to the body thereof and slotted at the lateral edges of the head portion to form sockets and the male fasteners being formed of sheet metal having laterally extending projections engageable with the sockets of two adjacent female fasteners.

3. In a fastener apparatus of the character described, in combination, a plurality of male fasteners each having a head with lateral projections, a plurality of female fasteners having heads bent at right angles to the shanks thereof and slotted on each side to provide recesses for receiving the lateral projection of the male fasteners.

4. A separable fastener comprising a pair of stringers, a series of cooperating male and female fasteners secured to the respective stringers and arranged to be engaged and disengaged by relative angular movement in the plane of the stringers, each female fastener being formed of sheet metal with a head portion bent at substantially a right angle to the body thereof to form a laterally projecting head, said head being slotted at its opposite edges to receive a portion of a cooperating fastener.

5. A separable fastener comprising a pair of flexible stringers, a series of cooperating male and female fasteners secured to the respective stringers, each female fastener being formed with an upstanding laterally extending head having slots at either edge, the slots being beveled to facilitate interengagement with a cooperating male fastener.

6. A cam device for connecting and disconnecting separable fasteners having guideways in the form of a Y, the upper separated portions of which guideways are parallel to each other in the direction of the length of the stem of the Y.

7. A cam device for connecting and disconnecting separable fasteners comprising a sheet metal blank folded on itself and formed to provide guide ways in the form of a Y, portions of the upper separated portions of such guide ways to which tension is like'y to be applied being extended parallel to each other in the direction of the length of the stem of the Y.

8. A cam device for connecting and disconnecting separable fasteners having converging guide ways arranged to cause the fasteners to interengage upon movement therealong in which the outer ends of said guide ways turn relatively toward each other from the diverging lines.

9. A separable fastening device comprising a pair of flexible stringers each having a corded edge, series of cooperating sheet metal male and female fasteners secured to the respective stringers, the shanks of the fasteners of each series being slitted to form tongues, alternate tongues being turned to opposite sides of the plane of the fasteners and bent to grip the corded edge.

10. A separable fastener as defined in claim 1 wherein the fastener consists of sheet metal stampings.

11. A separable fastener as defined in claim 1 wherein the edges of the fasteners are beveled to facilitate engagement and disengagement.

12. In separable fasteners, the combination of two stringers, a series of mating fastener members secured to the edge of both stringers, each of said members including a portion co-operable with a mating member and a shank portion of flat stock slitted to form adjacent tongues each partially encircling the edge of the stringer and engaging in alternation the opposite sides of the stringer.

13. In separable fasteners, the combination of two stringers, a series of mating fastener members secured to the edge of both stringers, each of said members including a portion co-operable with a mating member and a portion having a plurality of edge adjoining tongues each partially encircling the edge of the stringer and engaging in alternation the opposite sides of the stringer.

In testimony whereof, I have signed my name to this specification this 25th day of May, 1925.

FREDRICK ULRICH.